United States Patent
Allan et al.

(10) Patent No.: US 6,810,197 B2
(45) Date of Patent: Oct. 26, 2004

(54) ISOTOPICALLY ALTERED OPTICAL FIBER

(75) Inventors: Douglas C. Allan, Corning, NY (US); John T. Brown, Corning, NY (US); Lisa C. Chacon, Corning, NY (US); Adam J. G. Ellison, Painted Post, NY (US); James C. Fajardo, Painted Post, NY (US); Stuart Gray, Corning, NY (US); Keith L. House, Corning, NY (US); Karl W. Koch, III, Elmira, NY (US); Dale R. Powers, Painted Post, NY (US); James A. West, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/322,148

(22) Filed: Dec. 18, 2002

(65) Prior Publication Data

US 2003/0128955 A1 Jul. 10, 2003

Related U.S. Application Data

(60) Provisional application No. 60/341,256, filed on Dec. 20, 2001.

(51) Int. Cl.[7] .............................................. G02B 6/00
(52) U.S. Cl. ........................ 385/142; 385/123; 65/385
(58) Field of Search ................................ 385/123–128, 385/141, 142; 65/385, 391, 399

(56) References Cited

U.S. PATENT DOCUMENTS

| | | | | |
|---|---|---|---|---|
| 5,373,576 A | | 12/1994 | Minns et al. ................ | 385/125 |
| 5,692,087 A | | 11/1997 | Partus et al. ................ | 385/123 |
| 6,490,399 B1 | * | 12/2002 | Heitmann et al. ........... | 385/141 |
| 6,611,650 B2 | * | 8/2003 | Hayami et al. .............. | 385/142 |

FOREIGN PATENT DOCUMENTS

| | | | |
|---|---|---|---|
| DE | 197 49 312 | 1/2002 | ............ G02B/1/00 |
| EP | 0 977 714 | 1/2002 | ............. C03C/3/06 |
| WO | WO 98/47829 | 10/1998 | ............. C03C/3/06 |
| WO | WO 02/063356 | 8/2002 | ............ G02B/6/16 |

OTHER PUBLICATIONS

F. L. Galeener et al, "Vibrational dynamics in [18]O–substituted vitreous $SiO_2$", Physical Review B, vol. 23, No. 10, pp. 5527–5530, May 15, 1981.

A. A. Berezin, "Isotopic Engineering", J. Phys. Chem. Solids, vol. 50, No. 1, (1989), pp. 5–8.

A. A. Berezin, "Total internal reflection on isotopic interface: a case for isotopic fiber optics", J. Opt. Soc. Am. B, vol. 5, No. 3, Mar. 1988, pp. 728–729.

A. A. Berezin, "Light bending and light confinement at isotopic boundaries—possibility of isotopic fiber optics", Thin Solid Films, 158 (1987), pp. L37–L38.

* cited by examiner

*Primary Examiner*—Phan T. H. Palmer
(74) *Attorney, Agent, or Firm*—Robert L. Carlson (57) ABSTRACT

An isotopically-altered, silica based optical fiber is provided having lower losses, broader bandwidth, and broader Raman gain spectrum characteristics than conventional silica-based fiber. A heavier, less naturally abundant isotope of silicon or oxygen is substituted for a lighter, more naturally abundant isotope to shift the infrared absorption to a slightly longer wavelength. In one embodiment, oxygen-18 is substituted for the much more naturally abundant oxygen-16 at least in the core region of the fiber. The resulting isotopically-altered fiber has a minimum loss of 0.044 dB/km less than conventional fiber, and a bandwidth that is 17 percent broader for a loss range between 0.044–0.034 dB/km. The fiber may be easily manufactured with conventional fiber manufacturing equipment by way of a plasma chemical vapor deposition technique. When a 50 percent substitution of oxygen-18 for oxygen-16 is made in the core region of the fiber, the Raman gain spectrum is substantially broadened.

10 Claims, 12 Drawing Sheets

O16 core / O16 clad ———
O18 core / O18 clad ·········
O16 core / O18 clad – – –
O18 core / O16 clad – · – ·

FIG. 8

O16 core / O16 clad ———
O18 core / O18 clad ·········
O16 core / O18 clad – – –
O18 core / O16 clad – · – ·

FIG. 9

1. O16 core / O16 clad ———
2. O18 core / O18 clad ·······
3. O16 core / O18 clad - - -
4. O18 core / O16 clad — —

FIG. 10

1. O16 core / O16 clad ———
2. O18 core / O18 clad ·······
3. O16 core / O18 clad - - -
4. O18 core / O16 clad — —

FIG. 11

1. O16 core / O16 clad —
2. O18 core / O18 clad ·······
3. O16 core / O18 clad ---
4. O18 core / O16 clad —·—

FIG. 12

1. O16 core / O16 clad —
2. O18 core / O18 clad ·······
3. O16 core / O18 clad ---
4. O18 core / O16 clad —·—

100% O-18 (FWHM = 222cm$^{-1}$) - - -
~0% O-18 (FWHM = 237cm$^{-1}$) ——

FIG. 20

0% O-18 (FWHM = 178cm$^{-1}$) ——
50% O-18 (FWHM = 178cm$^{-1}$) ·······
100% O-18 (FWHM = 168cm$^{-1}$) - - -
average (FWHM = 203cm$^{-1}$) — —

ISOTOPICALLY ALTERED OPTICAL FIBER

CROSS-REFERENCE TO RELATED APPLICATION

This application claims the benefit of priority under 35 U.S.C. §119(e) of U.S. Provisional Application Ser. No. 60/341,256 filed on Dec. 20, 2001.

FIELD OF THE INVENTION

This invention generally relates to an isotopically altered optical fiber, and is specifically concerned with a silica fiber enriched with the heavier isotopes of oxygen and/or silicon in order to reduce transmission losses and to increase bandwidth.

BACKGROUND OF THE INVENTION

Optical loss is a limiting factor in the design and construction of optical networks and links, which typically include hundreds of kilometers of silica-based optical fiber. Consequently, a reduction in the loss of the fiber by even hundredths of decibels per kilometer would have a significant impact on the performance of such networks. Optical losses in silica fibers are predominantly caused by two factors, including (1) Rayleigh scattering, which falls off as a function of $1/\lambda^4$ and which dominates for shorter wavelengths, and (2) infrared absorption by the silica, which dominates for longer wavelengths. As is well known in the art, the product of these two forms of optical loss falls to a minimum at a wavelength of approximately 1560 nm. Consequently, most optical signals are transmitted at a bandwidth centered around 1560 nm in order to minimize transmission losses. At a bandwidth between 1510–1610 nm losses typically vary between a minimum of 0.189 dB/km and a maximum of 0.200 dB/km. As small as this may seem, such a loss rate still translates into a 50 percent loss of signal over a distance of 15 km, which is quite significant when one considers that some networks (such as the one traversing the Atlantic Ocean) are over 6,500 km long.

While there have been various attempts in the past to develop an optical fiber with lower transmissivity losses, the high costs associated with the manufacture of such fibers has prevented them from enjoying widespread use. So called silica core fibers, e.g., those having an undoped silica core and a fluorine doped cladding, are known which have reduced losses on the order of 0.151 db/km at 1550 nm are known. However, it is well known that silica core fibers are much more difficult to manufacture than fibers having cores which include index of refraction-altering dopants. Other types of fibers with potential for low loss are known which employ a non-silica chemistry. However, the materials used in such fibers are far more expensive than silica, and cannot be drawn and worked on a commercial scale without the development of completely different kinds of manufacturing equipment than is presently in use.

SUMMARY OF THE INVENTION

The invention relates to an optical waveguide comprising multiple isotopes of a same chemical element in relative proportions sufficiently changed from a naturally occurring proportion of the isotopes such that the optical losses are reduced in the vicinity of the standard 1510–1610 nm bandwidth, the bandwidth is substantially increased, and the Raman spectrum is broadened. The waveguide preferably is an optical fiber.

In one embodiment, the waveguide includes a light conducting core region comprised of silica glass, and at least a portion of the oxygen in the silica is comprised of multiple isotopes of oxygen in relative proportions which are changed from a naturally occurring proportion of oxygen. In particular, oxygen-18 makes up greater than 20 mole percent, more preferably greater than 50 mole percent, even more preferably greater than 70 mole percent, and most preferably greater than 80 mole percent of the total amount of oxygen in the core region. At the same time, in any of the embodiments disclosed herein wherein the amount of oxygen-18 is increased in the waveguide over that which is naturally occurring, the amount of oxygen-17 is likewise increased, preferably at least 5 percent, more preferably at least 10 percent, and most preferably at least 15 percent of the amount of oxygen-18 employed in the fiber. Consequently, for example, when the oxygen-18 is greater than 50 mole percent of the total oxygen present, it is preferable that the oxygen-17 be greater than about 2.5 mole percent, more preferably at least 5 mole percent, and more preferably greater than about 7.5 mole percent, of the total molar oxygen content.

As the losses due to Rayleigh scattering remain about the same for wavelengths in the range of about 1500 to 1800, nm while the losses due to infrared absorption in this range are reduced, the net effect is that a new minimum transmission loss of approximately 0.145 dB/km occurs near wavelengths of about 1670 nm. Because the loss curve with respect to wavelength is flatter in the vicinity of the new minimum, bandwidth over a variation of 0.010 dB/km (i.e., in a loss range of between 0.145 and 0.155 dB/km) is increased 17 percent over the 100 nm bandwidth of conventional germanium-doped fiber. If a maximum loss rate of about 0.19 dB/km can be tolerated (which is the minimum loss of the lowest loss germanium-doped fiber presently commercially available), bandwidth can be increased 100 percent. Finally, if a maximum loss rate of 0.200 dB/km can be tolerated (which is the loss rate of conventional fibers) bandwidth can be increased 275 percent.

While the resulting reduction of transmission losses between 0.034 and 0.044 dB/km would not appear to be large, such a reduction would translate into substantial savings, particularly in long distance transmission networks. For example, when conventional fiber is used to form a network traversing the Atlantic Ocean, the optical losses which occur necessitate signal regeneration stations for every 125 km of fiber. With the reduction in transmission losses of only between 0.034 and 0.044 dB/km, such regeneration stations are required only every 156 km. This would result in a net reduction of 11 regeneration stations. As such ocean based stations cost approximately one million dollars a piece, the net savings in a transatlantic transmission line amounts to over $11 million.

Another embodiment of the invention relates to an improved Raman gain fiber, the full width half maximum of the Raman gain spectrum in such fibers may be increased at least 5 percent over fibers made using naturally occurring oxygen. In this particular embodiment of the invention, the enrichment of either or both of the oxygen or silicon in the core region of the fiber with one of the heavier isotopes of either oxygen or silicon does not have to amount to a complete substitution, as it may be in other embodiments. Rather, if oxygen-18 is used as the enriching isotope, only about half of the oxygen in the core region need be oxygen-18, the balance being oxygen-16. The reason for such an incomplete substitution is that a complete substitution results in a complete shifting of the Raman gain spectrum, whereas a roughly 50 percent substitution of oxygen-18 for the oxygen-16 has the more advantageous effect of broadening the Raman gain spectrum by the superposition of an ordinary Raman gain spectrum with the shifted Raman gain spectrum which would be obtained if only oxygen-18 were used in the silica forming the core region. For example, in one embodiment, the core of the Raman gain fiber is comprised of layers of glass which alternate between layers which are enriched with oxygen-18, as described above, and layers of glass which are not enriched beyond that which is present in naturally occurring oxygen. Consequently, for embodiments involving Raman gain fiber, the level of substitution of oxygen-18 for oxygen-16 is preferably between about 30–70 mole percent, more preferably between about 40–60 mole percent, and most preferably between about 45–55 mole percent.

DETAILED DESCRIPTION OF THE INVENTION

Figure 1:
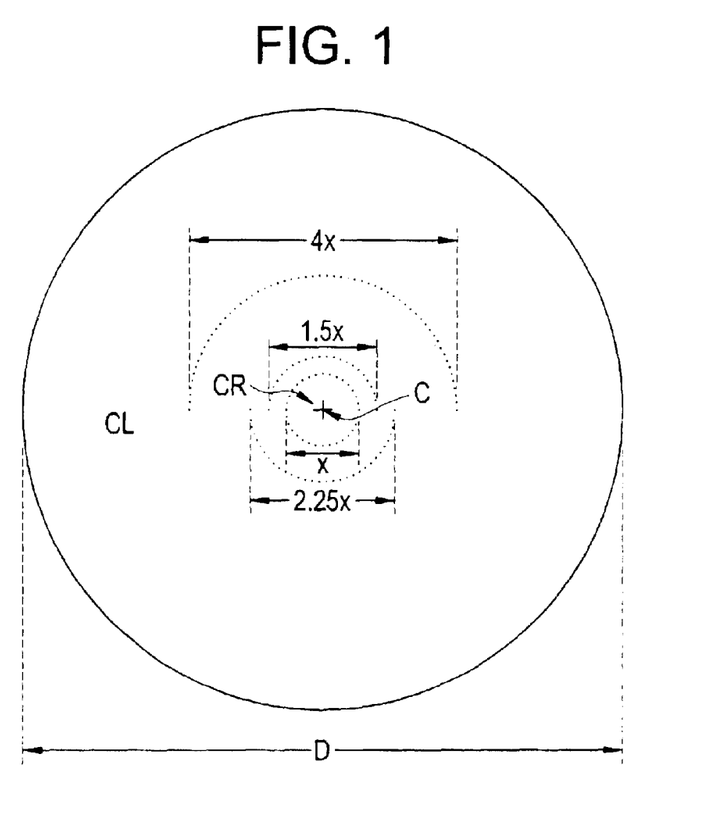
FIG. 1 is a cross-sectional view of a silica-based optical fiber illustrating the relative size of the core region CR and the cladding CL and the various regions of the fiber surrounding the core region CR where isotopic substitution of oxygen-18 and/or silicon 30 is preferred.

FIG. 1 illustrates one embodiment of the invention comprising a silica optical fiber having core region CR surrounded by a cladding CL, wherein the core region has been enriched with one of the heavier isotopes of either oxygen or silicon. The stable isotopes of silicon have atomic weights of 28, 29, and 30 with natural abundances of 92.23 percent, 4.67 percent, and 3.10 percent, respectively. In the case of oxygen, the stable isotopes have atomic weights 16, 17, and 18, with abundances of 99.762 percent, 0.038 percent, and 0.2 percent, respectively. In both cases, the most abundant isotope constituting silica ($SiO_2$) are the lightest stable isotopes. Stable isotopes are not radioactive and are stable over time and temperatures. The chemical behavior of the aforementioned isotopes are identical to their more abundant, lighter counterparts. Hence, as described in detail hereinafter, the chemical substitution of heavier isotopes such as silicon-30 or oxygen-18 for their lighter counterparts is easily implemented.

In the preferred embodiment of this invention, a substantial percentage of the oxygen-16 in the core region CR of the fiber is replaced with oxygen-18, or in other words, the amount of oxygen-18 in the fiber is greater than that which occurs naturally. There are two reasons for this. First, oxygen-18 may easily be integrated into the core region of a fiber via the same type of plasma vapor deposition techniques presently known in the art and disclosed in such references as the Partus et al., U.S. Pat. No. 5,692,087. Secondly, oxygen-18 is commercially available as it is presently being used for certain medical applications. However, it is presently expensive, costing about $550/gm.

Fortunately, as the vast majority of the light conducted by optical fibers is conducted through the core region, it is not necessary to replace the oxygen-16 in the cladding of the fiber in order to obtain enhanced optical performance. Specifically, it is estimated that approximately 80 percent of the modal volume of light is conducted through the core region illustrated in FIG. 1 that circumscribes a central axis C. As the core region in a standard, single mode fiber has a diameter of only about 9 microns, and as the overall diameter D of the fiber is approximately 125 microns, it follows that all of the benefits of the invention may be realized for 78 percent of the transmitted light if only 0.51 volume percent of the silicon dioxide of the fiber is enriched with oxygen-18. Consequently, in a preferred embodiment of the invention, the volume percent of the oxygen and the silicon dioxide of the fiber which is enriched with oxygen-18 is less than 4 percent, more preferably less than 3 percent, and most preferably less than 2 volume percent. Of course, greater benefits may be realized if oxygen-18 is substituted for oxygen-16 in the cladding immediately adjacent to the core region CR of the fiber. For example, if a circular area 1.5 times the area of the core region CR is so enriched, 87 percent of the modal volume of the light will "see" oxygen-18 enriched silica. If an area 2.25 times the area of the core region CR is enriched, at least about 95 percent of the light will "see" oxygen-18. Finally, if an area four times the area of the core region CR is enriched, virtually all of the light (99 percent) will traverse oxygen-18 enriched silica. Of course, such expansions of 1.5, 2.25, and 4.0 times the area of the core region CR will require the percentage of enriched silica to increase to 0.77 percent, 1.15 percent, and 2.04 percent, of the total silica respectively. In view of the high cost of oxygen-18 (presently about $500.00 per liter), the inventors contemplate a preferred embodiment wherein a central, circular area having a diameter of about 1.25 times the diameter of the core region CR is isotopically enriched with oxygen-18. Such proportioning would insure the capture of at least 90 percent of the light transmitting region of the fiber, while requiring that only about 0.8 percent by volume of the silica of the fiber be isotopically enriched with oxygen-18.

Figure 2:
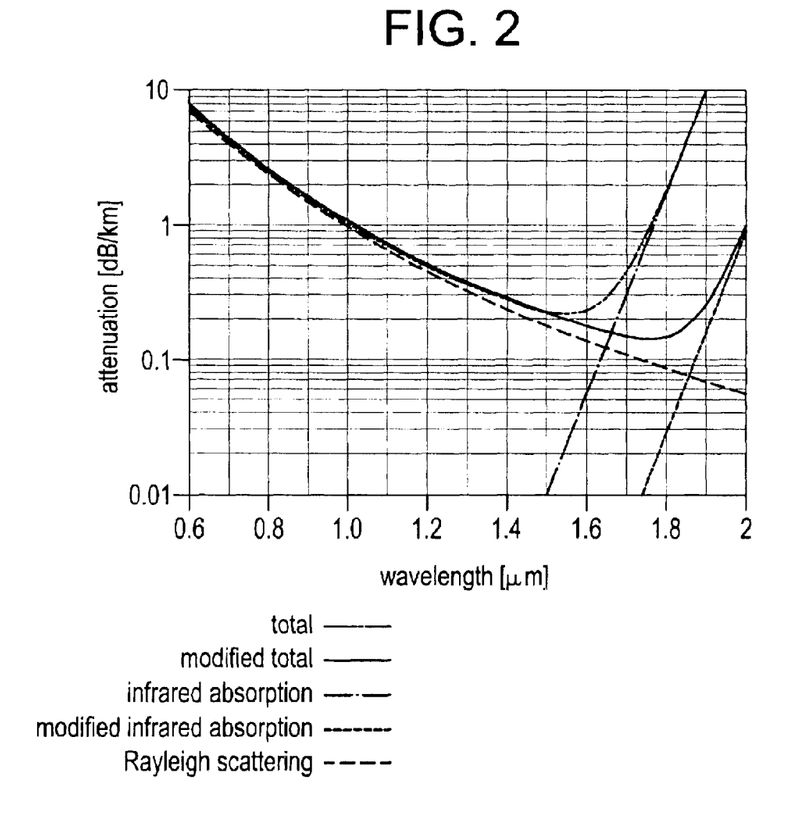
FIG. 2 is a graph comparing attenuation versus wavelength for germanium (Ge) doped silica fibers containing oxygen-16 and oxygen-18.
Figure 19:
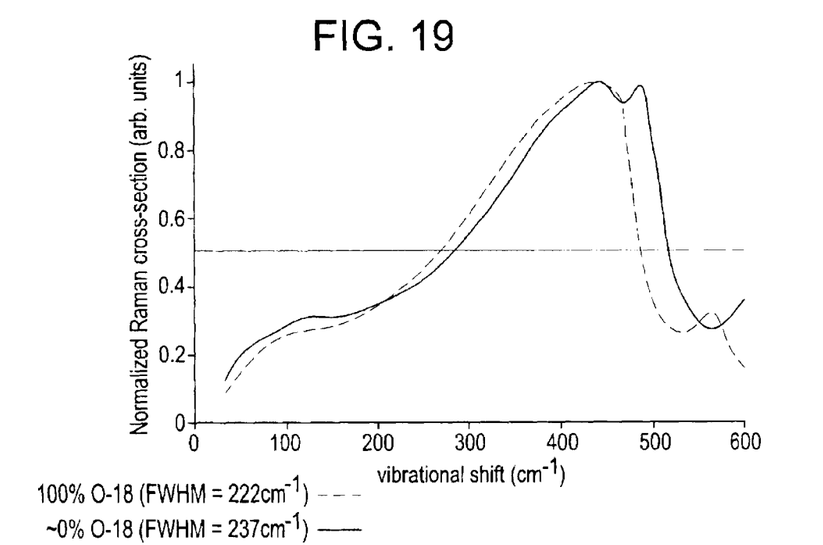
FIG. 19 compares measurements of the Raman cross-section of experimental single-mode optical fibers containing either essentially 100 percent oxygen-16 or essentially 100 percent oxygen-18.

FIG. 2 summarizes the lowered optical attenuation associated with the aforementioned substitution of oxygen-18 for oxygen-16 at least in the core region CR. As has been previously indicated, optical losses at shorter wavelengths are due predominantly to the scattering of light caused by fluctuations in the density of the glass. This phenomenon is called Rayleigh scattering. At longer wavelengths on or around 1550 nm, Rayleigh scattering losses taper off and losses are dominated by infrared absorption of the silica molecules. In conventional silica fibers, the minimum loss of 0.189 dB/km occurs at approximately 1550 nm. By contrast, as a result of the heavier oxygen-18 atoms lowering the frequency of the infrared absorption of the silica molecules, the minimum loss falls to 0.145 dB/km at a wavelength of about 1670 nm. As will be discussed in more detail with respect to the graph of FIG. 6, this lowered loss is accompanied by an increase in the usable bandwidth of the fiber due to the flatter nature of the attenuation curve (shown as a solid line) of the inventive fiber. Finally, as will be discussed with respect to FIGS. 19 and 20, the partial substitution of heavier isotopes of either the oxygen or the silicon in the core region of the fiber advantageously broadens the Raman gain spectrum of the fiber thus facilitating Raman amplification.

Figure 3A:
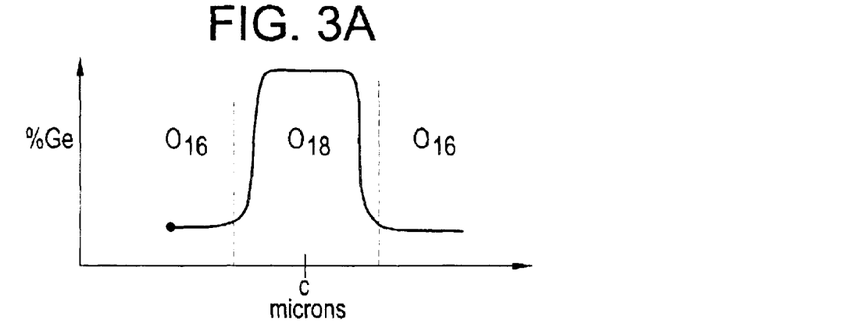
FIGS. 3A–3D illustrate exemplary refraction index profiles of a standard single-mode fiber, a large effective area fiber, a specialized single-mode fiber, and a dispersion-compensating fiber, and where oxygen-18 enrichment preferably occurs within these profiles.
Figure 3B:
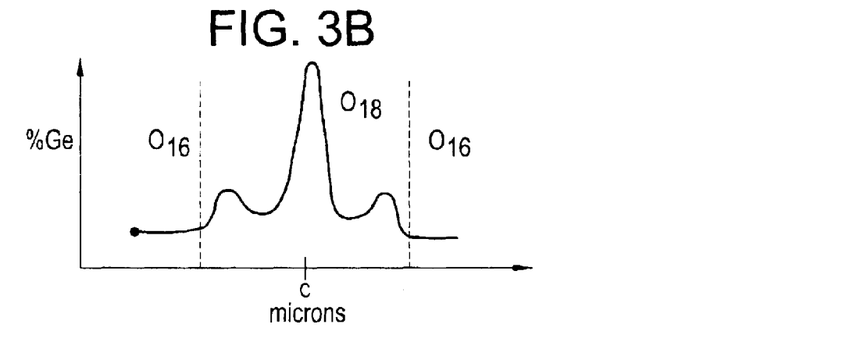
Figure 3C:
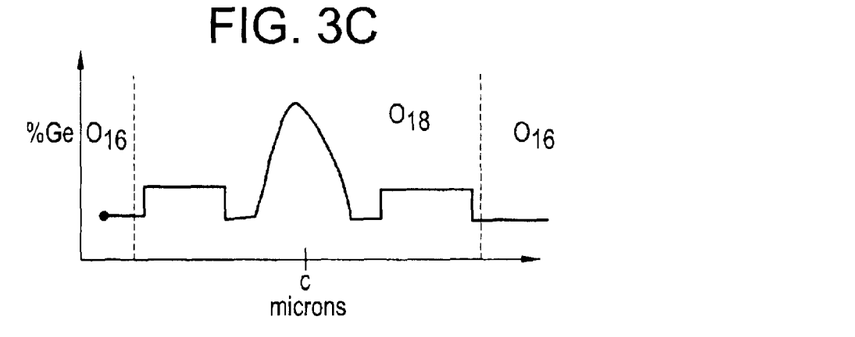
Figure 3D:
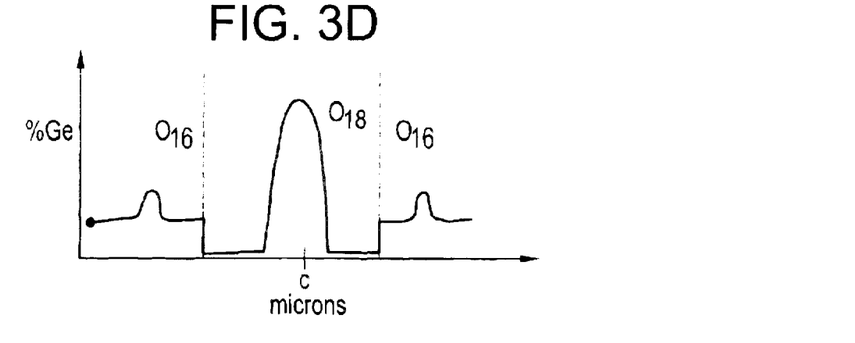

FIGS. 3A–3D illustrate the extent to which the core region CR of an optical fiber might be enriched with oxygen-18 relative to its index profile in order to obtain the advantages of the invention. FIG. 3A illustrates the index profile of a standard, single mode fiber. Here, the core region containing the germanium dopant is enriched with oxygen-18. For standard step index single mode fibers such as Corning's SMF-28, this amounts to an enrichment of the fiber of at least approximately 4 microns on either side of central axis C to capture substantially all of the flattened bell curve of germanium concentration. Preferably, the $SiO_2$ is enriched a distance into the cladding which is adjacent to the core region, for example, a distance great enough to reach the $SiO_2$ clad region. Such an enrichment pattern should result in at least 80 percent of the transmitted light "seeing" the oxygen-18 enriched silica. FIGS. 3B–3D illustrate various segmented core refractive index patterns. FIG. 3B is the index profile of a large effective area fiber. Here, oxygen-18 enrichment should extend out to just beyond the two side peaks of germanium dopant concentration. Again, this would typically amount to providing an oxygen-18 enrichment of the silica between about 4 and 5 microns from the central axis C of the fiber. FIG. 3C illustrates a specialized single mode fiber, or a variation of the fiber index illustrated in FIG. 3B. Here, the same principal applies and that part of the core region CR encompassing both side peaks of germanium dopant concentration should likewise be enriched with oxygen-18. Again, this amounts to an enrichment of the core region CR a radial distance of between 4 and 5 microns from the central axis C. FIG. 3D illustrates the index profile of a dispersion compensating fiber. Here, only that portion of the core region CR containing the central peak might be enriched with oxygen-18 since enrichment of the areas containing the side peaks would increase the deleterious effects of higher order mode transmission. For certain dispersion compensating fibers, such as the one illustrated in FIG. 3D, it may be desirable to keep the attenuation higher in the regions of the outer ring, because by doing so, these regions will attenuate more than the inner regions of the core, helping to decrease the higher order modes which travel in this region, which in turn will help decrease signal noise generated by multipath interference. While the transitions between oxygen-18 and oxygen-16 have been schematically illustrated as being sharp transitions, the invention encompasses designs wherein smoother transmissions between the enriched and unenriched silica are deliberately manufactured in order to create an 0–18/0–16 gradient of a micron or two. Such a gradual transition may be used to advantageously control the diffusion which results from the difference in the index of refraction between ordinary silica and isotopically enriched silica.

Figure 4:
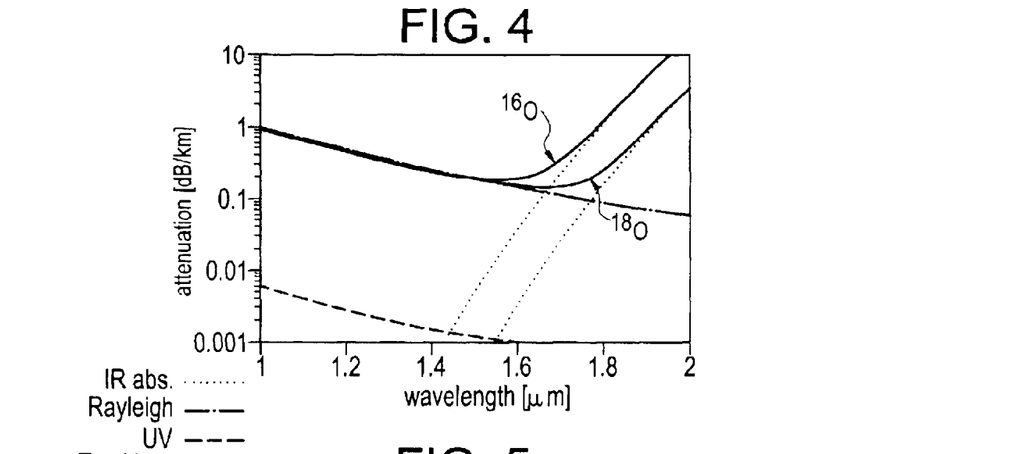
FIG. 4 compares the attenuation between a conventional optical fiber (having predominantly oxygen-16) and a fiber of the invention enriched with oxygen-18 on a logarithmic scale.
Figure 5:
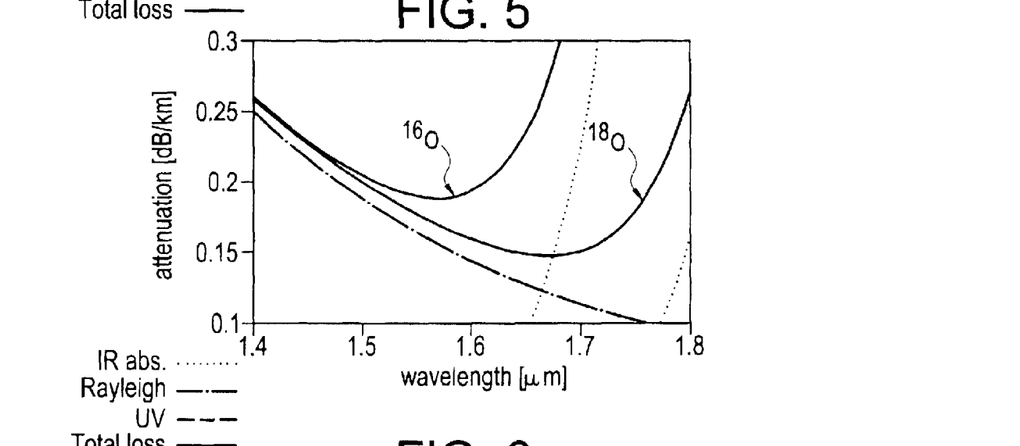
FIG. 5 compares the fibers referred to in FIG. 4 on a linear scale.
Figure 6:
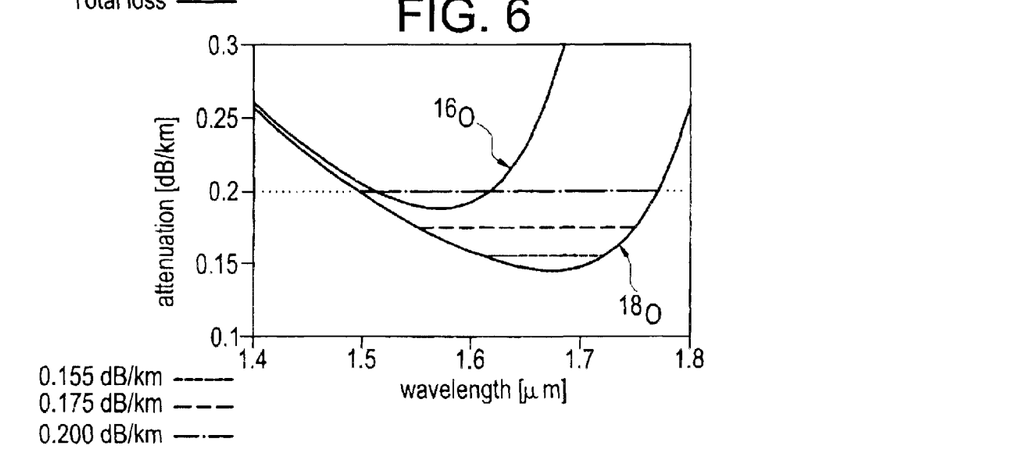
FIG. 6 also compares conventional and oxygen-18 enriched optical fibers on a linear scale, and further illustrates the broadening of transmission bandwidth associated with oxygen-18 enriched fibers.

FIGS. 4, 5, and 6 illustrate, in more detail, the advantageous loss characteristics of the isotopically altered fibers of the invention. FIG. 4 parallels the graph of FIG. 2 with the exception that ultraviolet losses are included. FIG. 5 illustrates via a linear scale the relative attenuation between the fibers formed from ordinary silica having predominantly oxygen-16, and fibers of the invention having a core region CR enriched with oxygen-18. FIG. 6 is similar to FIG. 5, with the exception that the bandwidth expansion advantages of the invention are clearly illustrated. In particular, for a decibel loss differential of 0.02 dB/km (i.e., the same differential tolerated in standard silica fiber), the bandwidth of the fiber of the invention is 17 percent longer than the approximately 100 nm bandwidth associated with conventional fiber. If a maximum loss of 0.175 dB/km can be tolerated (which is the same loss associated with the lowest-loss silica fiber presently commercially available) then the bandwidth can be extended approximately 100 percent as illustrated by the dotted line. Finally, if the same amount of loss that can be tolerated is the same as the maximum loss associated with conventional fiber (i.e., 0.200 dB/km) then the bandwidth expands approximately 270 percent. Although current optical networks do not use such a broad bandwidth, future networks may require the additional bandwidth to add more wavelength-division multiplexed channels to handle the growing global bandwidth consumption. Such broad bandwidth may also be attractive in networks that use coarse wavelength-division multiplexed in which few channels are broadly spaced in wavelength. Coarse wavelength division multiplexing is used in shorter-haul metro or access networks.

FIG. 5 illustrates the relative effect that can be achieved by replacing a portion of the oxygen-16 in the silica based fiber with oxygen-18. In the embodiment illustrated, 100 percent of the oxygen in the silica lattice has been replaced by oxygen-18. Clearly, the attenuation of the oxygen-18 fiber is much lower overall than that of the oxygen-16 fiber. For example, incorporation of oxygen-18 into the silica based fiber would result in an unprecedented increase in bandwidth, greater than 150, more preferably greater than 200, and most preferably greater than 250 nm of bandwidth having an attenuation of less than 0.2 dB/km. Alternatively, an even lower attenuation bandwidth could be utilized, i.e., greater than 100 nm, more preferably greater than about 200 nm bandwidth having an attenuation less than 0.18 dB/km. FIG. 5 illustrates the comparison between a conventional step index germania doped silica based fiber (similar to Corning's SMF-28), and an oxygen-18 doped version of the same fiber. As can be seen in FIG. 5, doped with oxygen-18 enables a step index germania doped single mode fiber having an attenuation less than 0.18, more preferably less than 0.17, and most preferably less than 0.16 dB/km, for example at about 1670 nm.

Figure 7:
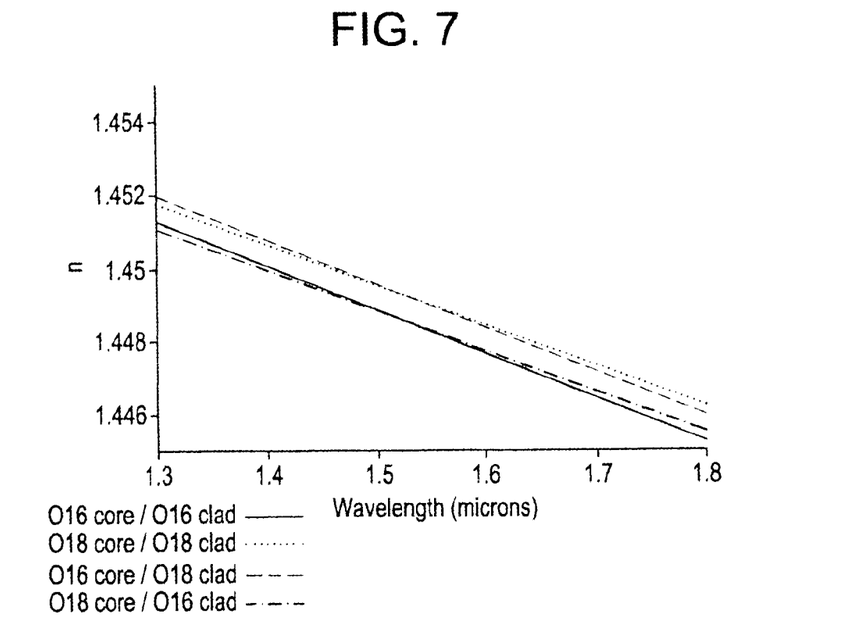
FIG. 7 illustrates how the index of refraction varies with different optical wavelengths for a conventional fiber, a fiber having a core isotopically enriched with oxygen-18 in a cladding without isotopic enrichment, and a non-isotopically enriched core with a cladding enriched with oxygen 18.
Figure 8:
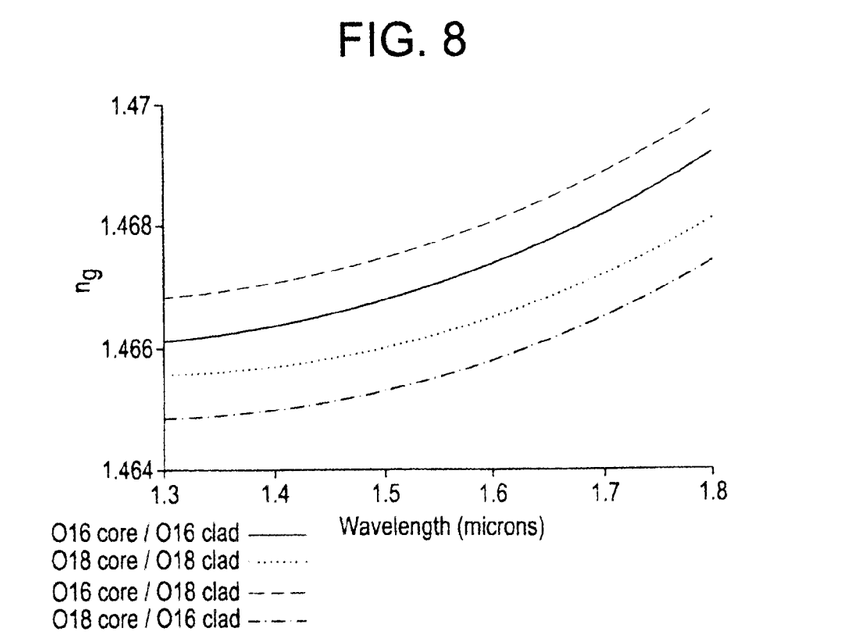
FIG. 8 is a comparison of the group index of refraction for the same optical fibers as described with respect to FIG. 7.
Figure 9:
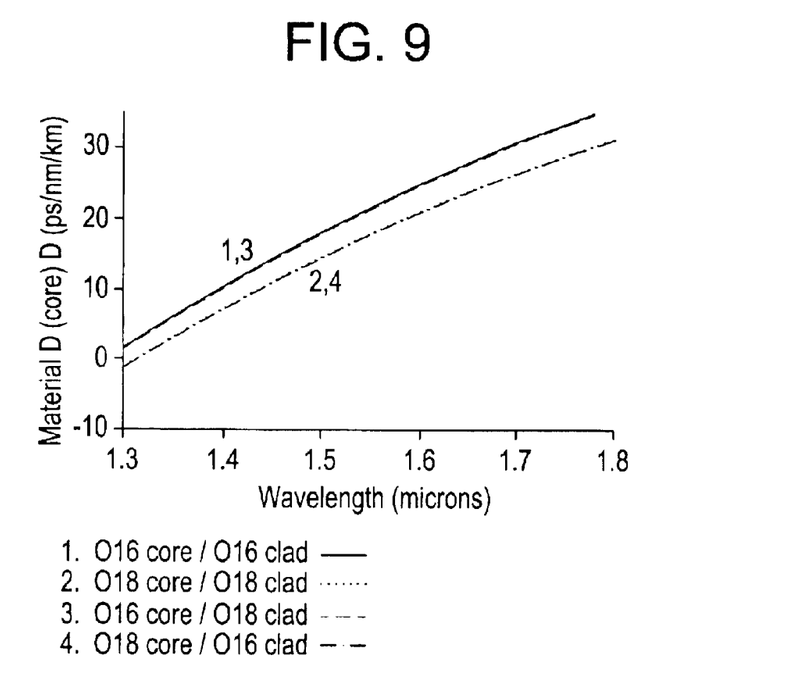
FIG. 9 compares material dispersion between conventional single mode optical fibers and the same optical fibers having either or both the core and the cladding enriched with oxygen-18.
Figure 10:
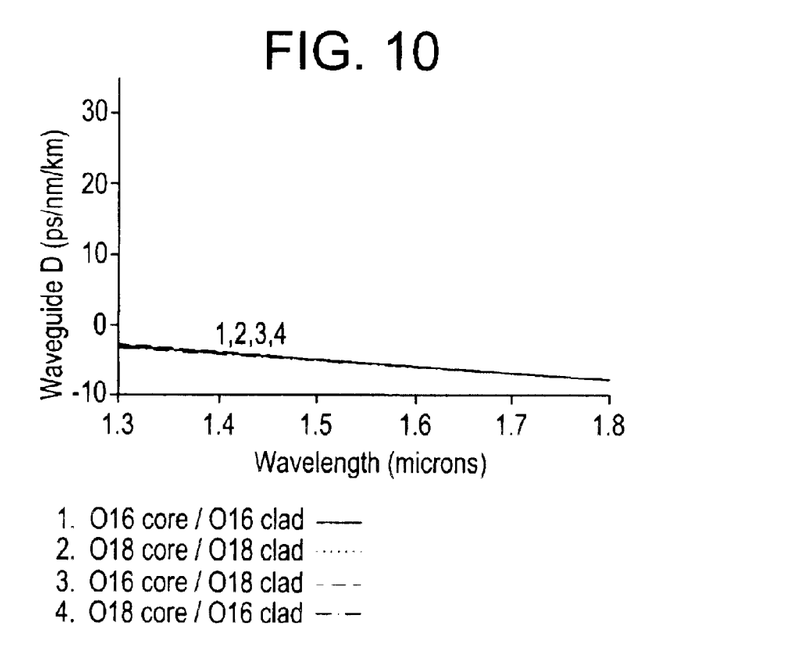
FIG. 10 compares with waveguide dispersion vs. wavelength of the same type of fibers compared in FIG. 9 with respect to waveguide dispersion.
Figure 11:
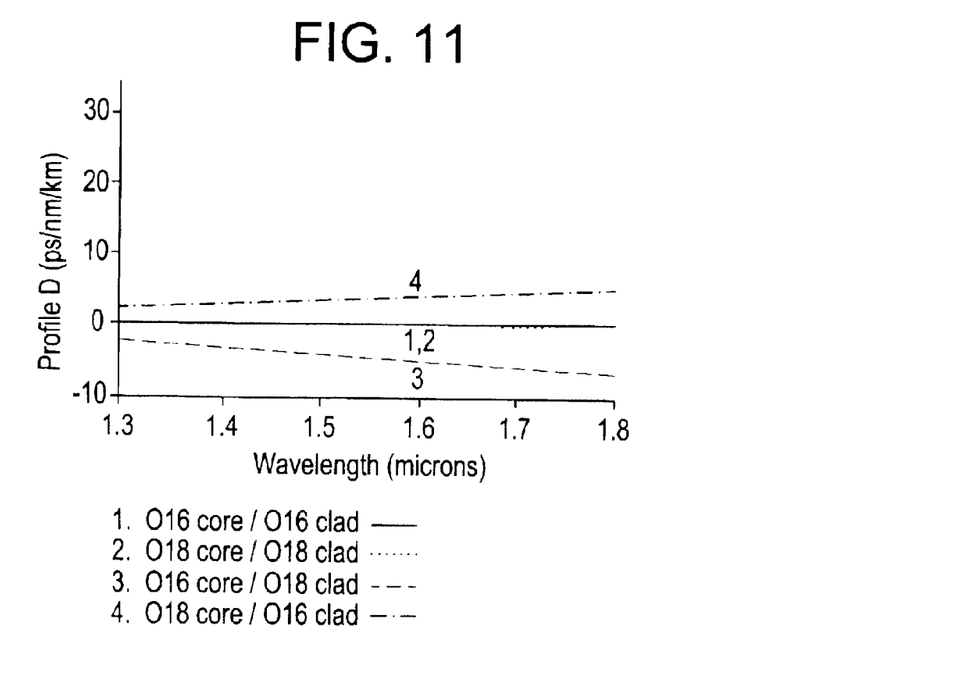
FIG. 11 compares the profile dispersion vs. wavelength of the same type of fibers compared in FIG. 9.
Figure 12:
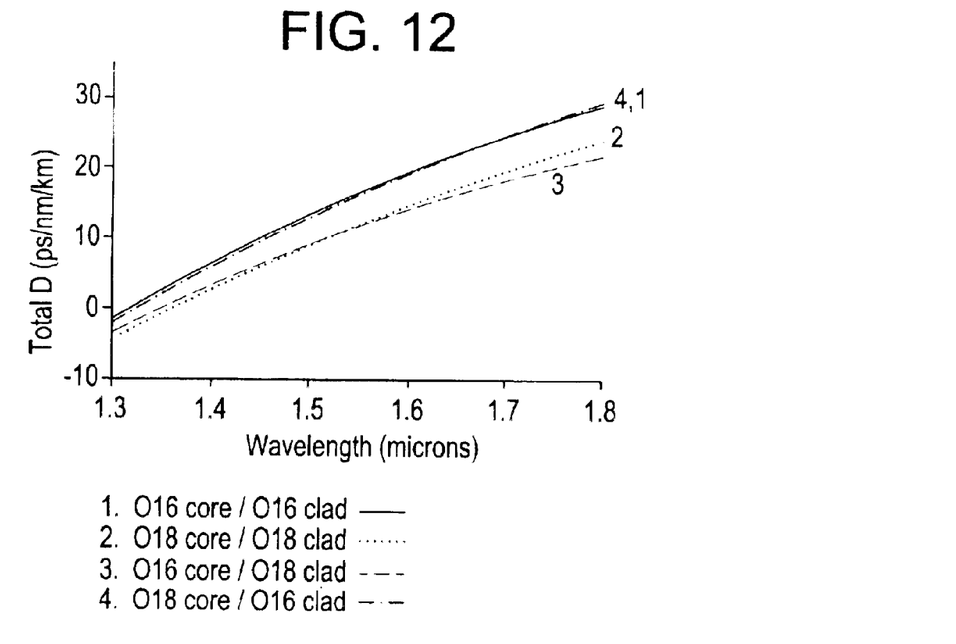
FIG. 12 compares the total chromatic dispersion vs. wavelength of the same type of fibers compared in FIGS. 9–11.
Figure 13:
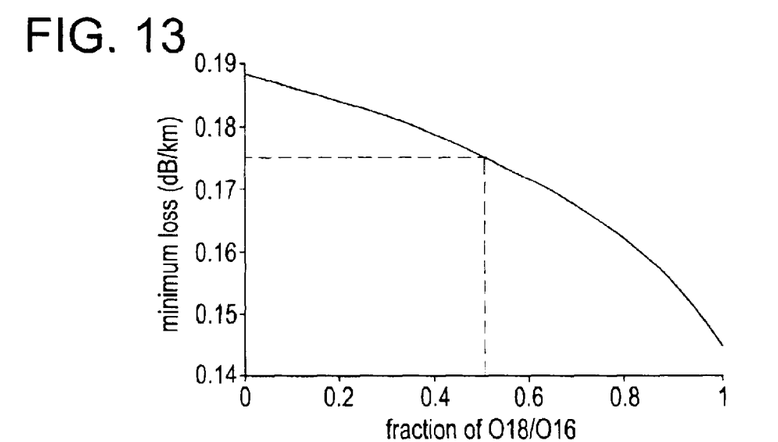
FIG. 13 illustrates minimum loss as a function of the percentage of oxygen-18 in the core region of the fiber.
Figure 14:
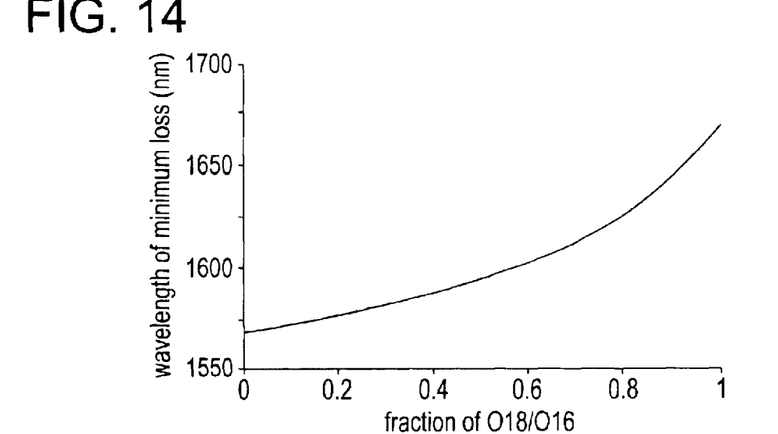
FIG. 14 is a graph of the wavelength corresponding to the minimum loss as a fraction of the amount of oxygen-18 in the core region of the fiber.
Figure 15:
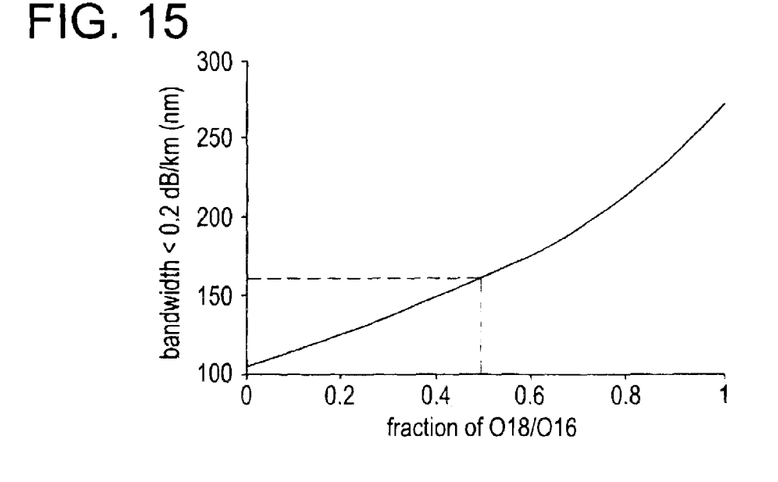
FIG. 15 is a graph of the increase in bandwidth as a fraction of the amount of oxygen-18 in the core region of the fiber.

FIGS. 7–12 are various graphs illustrating differences in the index of refraction and dispersion between conventional silica, germania doped, step-index single mode fibers (e.g. such as Corning's SMF-28™) and the same fiber which has been isotopically enriched in accordance with the invention. FIG. 7 compares how the index of refraction varies over wavelength for a conventional single mode fiber, and fibers of the invention having either an isotopically enriched core and conventional cladding or conventional core region and an isotopically enriched cladding. FIG. 8 graphically compares the same quantities for the same fibers in terms of group index (i.e., index of refraction with respect to pulse signals as opposed to wave fronts). Both of these graphs illustrate the fact that silica enriched with oxygen-18 has a higher index of refraction, and that the more such enriched silica is present in the fiber, the more effect the higher index of refraction for enriched silica has on the fiber as a whole. There are two major consequences of these differences in the index of refraction. First, the significantly higher index of refraction of isotopically enriched silica may advantageously be exploited to lowers costs by reducing the amount of germanium or other dopant used to create the index difference between the core region and the cladding necessary to effect total internal reflection. Such a lowering in the concentration of dopant will have the advantageous effect of reducing the amount of Rayleigh scattering, hence further lowering the losses created with the fiber of the invention. Additionally, the lower dopant concentration will provide a lower viscosity mismatch between the core and cladding leading to lower stress-induced losses. Secondly, when only the core region or the cladding of the fiber is isotopically enriched, the resulting difference in index of refraction between the core and cladding offers the fiber designer a new parameter by which to manipulate or correct the resulting dispersion characteristics of the fiber. Such differences in dispersion are most evident in graphs such as FIG. 11 and FIG. 12. FIGS. 13, 14, and 15 illustrate the minimum loss, the wavelength of minimum loss, and the amount of bandwidth associated with attenuation losses of less than 0.20 dB/km as a function of the percentage amount of oxygen-18 present in the core region. The curves in these graphs illustrate the desire for replacing substantially all of a naturally occurring isotope of silica or oxygen with a heavier isotope such as oxygen-18 if the benefits of the invention are to be maximized, as each of these curves is nonlinear. In particular, FIG. 13 illustrates that if only 50 percent of the oxygen in the core region is replaced with oxygen-18, then the attenuation loss will fall to only about 0.174 dB/km. Stated differently, a 50 percent replacement of oxygen-16 with oxygen-18 results in only 30 percent of the maximum reduction of attenuation that can be achieved with 100 percent substitution. These same proportions apply with respect to advantages in increased bandwidth, as borne out by FIG. 15. Specifically, if only 50 percent of the oxygen-18 in the core region silica is replaced with oxygen-18, bandwidth expansion is only 30 percent of the maximum expansion available when a 100 percent substitution is implemented. In view of these nonlinear relationships in a preferred embodiment a manufacturing process is chosen which is effective in replacing substantially all of the oxygen-16 in the core region with oxygen-18. However, due to the practical difficulty involved with some manufacturing processes, it may be difficult to achieve substitution of substantially all of the oxygen-16. Consequently, the oxygen -18 substitution should be greater than 20 mole percent, more preferably greater than 50 mole percent, even more preferably greater than 70 mole percent, and most preferably greater than 80 mole percent of the total amount of oxygen-16 in the core region.

At the same time, in the preferred embodiments of the invention, the amount of oxygen-17 is at least 5 percent, more preferably at least 10 percent, and most preferably at least 15 percent of the amount of oxygen-18 employed in the fiber. Consequently, for example, when the oxygen-18 is greater than 50 mole percent of the total oxygen present, it is preferable that the oxygen-17 be greater than about 2.5 mole percent, more preferably at least 5 mole percent, and more preferably greater than about 7.5 mole percent, of the total molar oxygen content.

Figure 16:
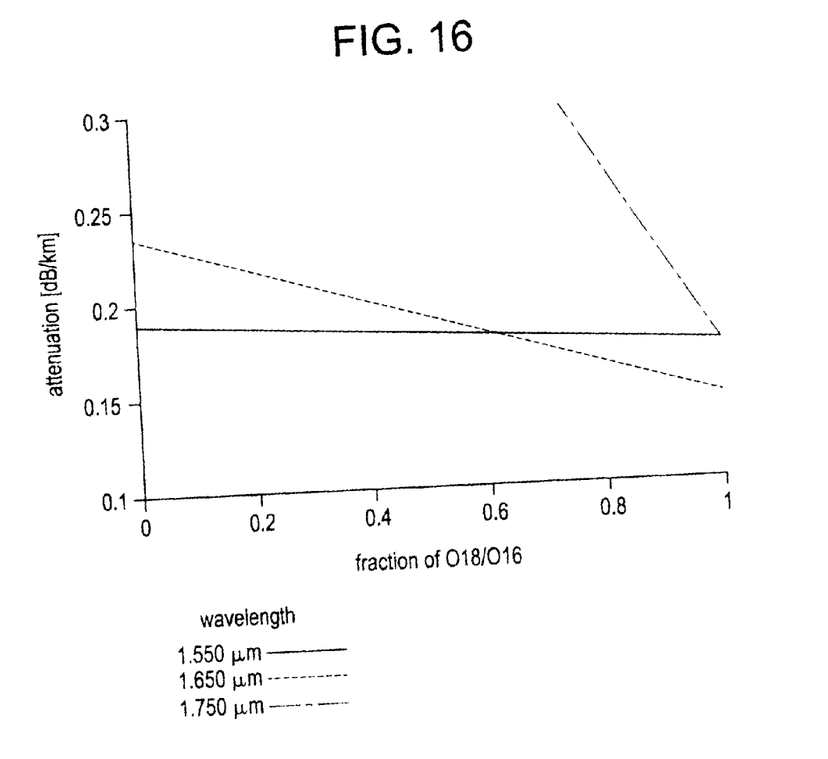
FIG. 16 is graph of the attenuation of optical fiber as a function of percentage of oxygen-18 in the core region of the fiber.

FIG. 16 illustrates that, for a conventional germania doped step index fiber, the amount of attenuation that occurs when a 100 percent oxygen-18 substitution is achieved is lowest at a wavelength of 1670 nm. As this wavelength of minimum attenuation is somewhat higher than the minimum attenuation wavelength associated with conventional fibers (which is approximately 1560 nm), this graph illustrates the desirability of utilizing the fiber of the invention with optical components designed to operate near the "red" end of the optical communication spectrum. For example, in one embodiment, the fiber is employed in a telecommunications system which comprises at least a transmitter and a receiver, and the transmitter and receiver are configured to operate at a wavelength greater than about 1625, more preferably greater than about 1635.

Figure 17:
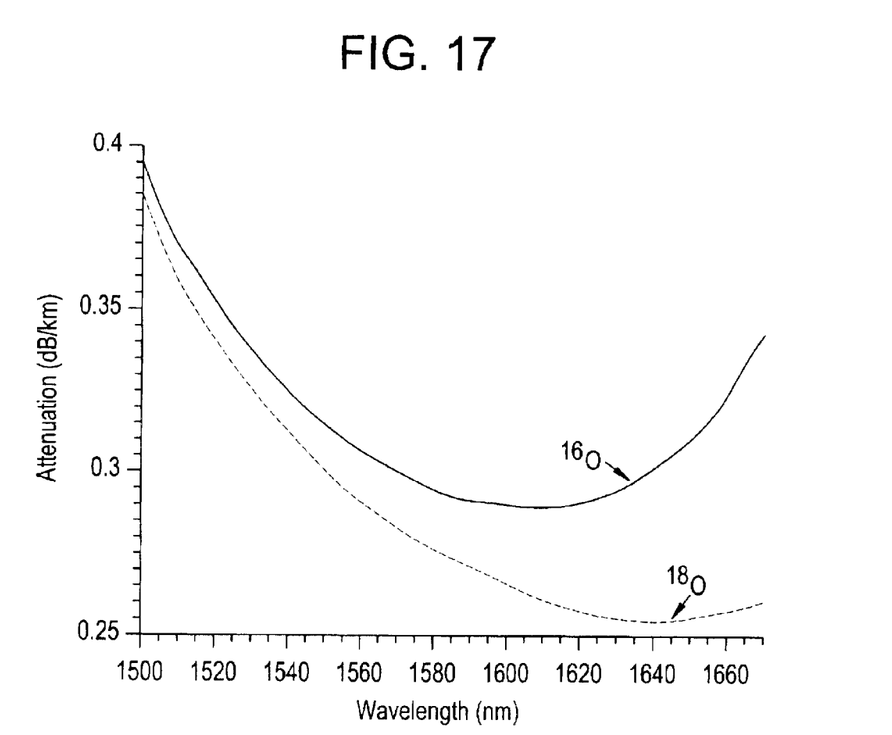
FIG. 17 compares the attenuation of a wavelength of conventional fiber with fibers of the invention.

FIG. 17 is a graph of attenuation as a function of wavelength for a step index, germania doped single mode fiber of the invention produced by way of a plasma vapor deposition process. As is evident from this graph, the measured difference in loss between a conventional fiber (upper line) and the fiber of the invention (bottom dashed line) was 0.044 dB/km in accordance with the result predicted by the previous graphs.

Figure 18A:
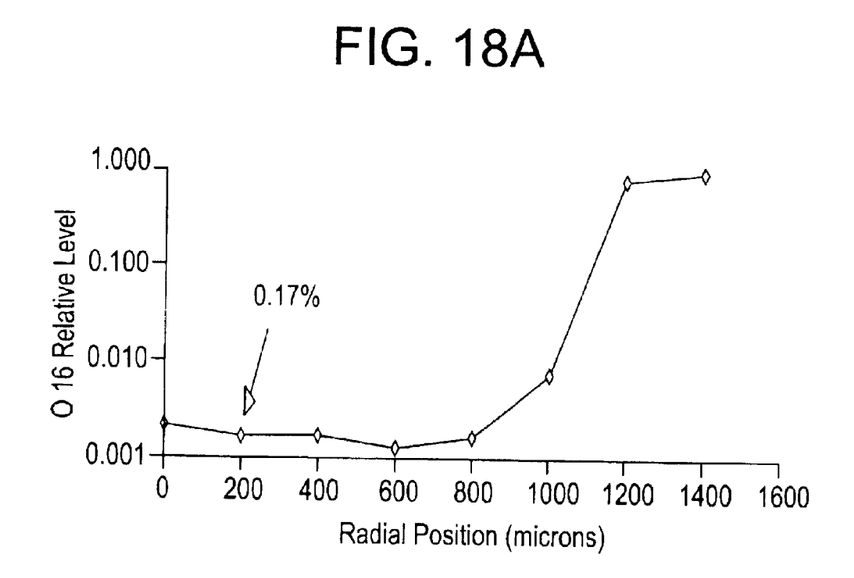
FIGS. 18A and 18B are complementary graphs showing relative amounts of oxygen-16 and oxygen-18 with respect to a radial position from the core region of a cane from which the fibers of the invention are drawn.
Figure 18B:
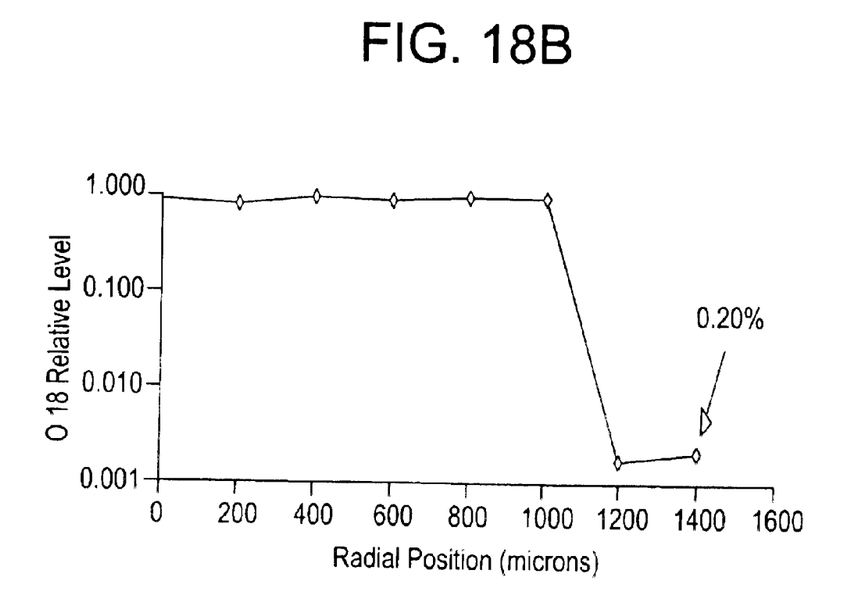

FIGS. 18A and 18B graphically illustrate radial profiles, in mole percent vs. radial position, of the oxygen isotopes present in the core region of an optical fiber core cane comprised of silicon dioxide produced from the aforementioned PCVD process. In these graphs, the overall core cane diameter was 16 mm in diameter, while the core region was 2 mm in diameter. As is evident from both of these graphs, a nearly 100 percent substitution of oxygen-18 for oxygen-16 was accomplished for a radius of approximately 1000 microns. This 1000 microns will correspond to a radius of approximately 4 to 5 microns in the drawn fiber. Hence, the PCVD process may be used to produce fibers in accordance with the invention having core regions wherein the oxygen-16 is greater than 50 percent, preferably greater than 60 percent, more preferably than 75 percent, and most preferably greater than 93 percent replaced with oxygen-18, thereby realizing substantially all of the potential benefits of the invention illustrated in FIGS. 6, and 13–15. It is believed that these same amounts of oxygen-18 substitution can be achieved using MCVD techniques. As is the case with all embodiments disclosed herein, preferably, the oxygen-18 containing layers of glass also contain oxygen-17, in the relative concentrations described above (at least 5 percent, more preferably at least 10 percent, and most preferably at least 15 percent of the amount of oxygen-18 employed in the fiber).

In order to achieve the previously referred-to core cane of isotopically enriched silica, the following PCVD process is used. First, a flow of gas including at least one silica glass-forming precursor ($SiCl_4$) and a germania dopant ($GeCl_4$), and an oxidizing agent containing substantially 100 percent oxygen-16 is directed, under low pressure, through a heat-resistant silica glass tube (outer diameter=25 mm) which will form the cladding of the optical fiber core cane. Simultaneously, the tube is heated with a plasma heat source, which may be an oxygen/argon plasma heat source. The plasma zone is traversed along and around the tube, causing SiO and GeO to react and deposit on the innermost walls of the tube as fully consolidated glass. The traversing of the plasma zone is continued and the levels of different components in the gas stream are varied so as to effect changes in the compositions of the outermost glass layers, which will eventually become part of the cladding of the fiber. Several hundreds of layers were deposited. As the layers of glass that are to become the core region of the core cane are approached, the gas stream composition flowing through the tube is adjusted such that substantially 100 percent of the oxygen is oxygen-18. To accomplish this, 99 percent isotopically pure oxygen-18 was flowed into the tube at a point to coincide with the core region and to extend 100 $\mu$m radially beyond that region. As can be seen in FIGS. 18A and 18B, the oxygen-18 distributed exactly as intended. At the same time, the amounts of necessary dopant (in this case germanium) are adjusted. After all of the desired layers of glass have been deposited, the resulting tube of glass is collapsed to form the optical fiber core cane, which consisted of both the doped core region and a small portion of the cladding. Additional undoped $SiO_2$ soot was then added to the outside of the core cane to produce a fiber preform. Then the preform was consolidated and drawn into optical fiber. With such processing, the core-cane material becomes center 40 micron diameter region of the optical fiber which, of course, contains the smaller 10 micron diameter core region. One advantage to using the PCVD process is the excellent utilization of the isotope dopant, to amounts as high as 90–100 percent utilization of the oxygen-18 dopant. In this demonstration we achieved 50 percent oxygen utilization.

In one preferred embodiment of the invention, a quantity of silica based soot is deposited using oxygen-16, and then a portion of the oxygen-16 in the fiber soot blank is converted to oxygen-18 (and preferably oxygen 17 as well) by doping of the fiber soot blank prior to consolidation of the soot into consolidated glass. For example, in the conventional outside vapor deposition process, soot is deposited onto a bait rod. In the preferred embodiment of the present invention, the core region is first deposited onto the bait rod. For example, in the case of a step index single mode fiber, a germania doped portion of silica soot can be deposited onto bait rod to form a porous soot blank. The bait rod is then removed from the soot blank to leave a hole down the center of the porous soot blank. The soot blank is then suspended in a consolidation furnace, and appropriate gases are flowed through and around the blank to remove hydroxyl groups (e.g. chlorine is typically used to dry the soot). Either prior to or subsequent to the drying step, the soot blank is introduced to oxygen that is enriched with oxygen-18 (and preferably oxygen 17 as well) isotope. As the oxygen diffuses through the porous body, an oxygen atom incorporated in the silica matrix may undergo a surface-mediated exchange with the gaseous molecular oxygen. On a microscopic scale such exchanges will occur indefinitely but macroscopically the process will reach a thermodynamic equilibrium at which the ratio of isotopes in the gas phase will be equal to the ratio of isotopes in the solid phase. This process is done at temperatures and pressures which allow for efficient exchange of oxygen-18 for oxygen-16 within the soot particles that make up the blank. Preferred temperatures for such processes are greater than 900, more preferably greater than 1000, and most preferably greater than 1100 C. For a temperature of 1162 degrees Celsius and pressure of 1.0 atmosphere this equilibrium was demonstrated to be reach in approximately 110 minutes. The flow of oxygen-18 is stopped when sufficient oxygen-18 has been delivered to displace the oxygen-16 within the core region inside the blank.

After exchange of the oxygen-18 for the oxygen-16 in the soot particles, the blank is heated and consolidated into a clear glass preform. In subsequent processing steps, the centerline hole is closed to form a core cane, as is known in the art. This consolidated glass core region, which consists of the germania doped portion and preferably a small portion of the cladding would consist largely of oxygen-18 doped $SiO_2$. This core cane could then have additional cladding soot deposited onto the outer periphery, after which this cladding soot could be dried and consolidated to form a optical fiber preform which can be drawn into an optical fiber. If desired, this additional soot could likewise be exchanged with oxygen-18. However, in the preferred embodiment only the core portion and a optional small adjacent region of the cladding is converted to oxygen-18.

Various gases could be employed to dope the soot preform of oxygen-18. For example, the mixture of oxygen-18, oxygen-17 and oxygen-16, oxygen-18 enriched air, pure or substantially pure oxygen-18 gas, $D_2^{18}O$, $H_2^{18}O$, and mixtures thereof could be employed. In one preferred embodiment, $D_2^{18}O$ and/or $H_2^{18}O$ is employed as the doping or exchange gas. For example, we have found that the exchange of $H_2^{18}O$ with silica soot reaches equilibrium in less than about 7 minutes at 1162 Celsius. The soot is preferably exposed to greater than 50 atom percent oxygen-18, more preferably greater than 95 atom percent oxygen-18, during the oxygen-18 conversion step. Preferably, the oxygen-18 containing gases also contain oxygen-17, in the relative concentrations described above (at least 5 percent, more preferably at least 10 percent, and most preferably at least 15 percent of the amount of oxygen-18 employed in the fiber). The time required for isotopic exchange with the soot is preferably minimized by using high temperature, but preferably the temperature is not so hot that sintering of the soot occurs since the resulting reduction in porosity would limit isotopic exchange.

Preferably, in any manufacturing operation which employs use of oxygen-18 in a fashion in which less than 100 percent of the oxygen-18 is used up during the process, the process employs a means for recycling the unused oxygen-18 containing dopant or exchange gas back into the manufacturing process. For example, in the above process described to dope oxygen-18 during the consolidation of the soot, the waste oxygen may be recovered from the consolidation furnace and fed back into the consolidation furnace at a later time or continuously throughout the doping process. Preferably the waste oxygen is cycled to an oxygen purifier to produce a nominally pure oxygen stream. If necessary the purified oxygen may be fed to an isotopic separation unit which further enhances the percentage of oxygen-18 in the oxygen stream, thereby producing a nominally pure oxygen-18 stream to be fed back into the consolidation furnace. The recycled oxygen-18 stream may be fed to a holding tank, back into the manufacturing process, or vented if it does not meet a required purity level. In the preferred embodiment, which is employed to dope oxygen-18 into the OVD formed soot core cane prior to consolidation, waste oxygen is separated from the exhaust gas, tested for purity (with a residual gas analyzer, for example) and then recirculated back to the input gas stream where it is combined with the feed stream of oxygen. In an MCVD or PCVD process, the oxygen in the exhaust gas should contain the same isotopic ratio as that of the input stream. Thus, if 100 percent oxygen is used in the input stream there is likely no need to do an isotopic separation of the exhaust oxygen. However in an OVD or VAD process, in which soot is to be doped using oxygen-18, there will likely be a need for isotopic separation because of the dilution of oxygen-18 from the oxygen-16 present in the ambient air, the burner oxygen, and any oxygen-16 contained in the burner fuel ($CO_2$, for example). Removal of the fuel oxygen may be simplified because it will likely be in the form of water. The recirculation is not necessarily continuous and may involve a temporary holding tank in which enriched oxygen is stored. The non-isotopic oxygen separation may include solid and fluid separation, cryogenic separation, chemical absorption, catalytic reaction, absorption systems, membrane separation, and pressure or thermal swing absorption systems, and combinations thereof. For example, the oxygen separation might consist of a particular filter for separating the soot from the exhaust gases; a treatment of the soot with carbon to generate $C-{}^{18}O_2$ from which the oxygen-18 will be subsequently released (by solid oxide electrolysis, for example); and a cryogenic separation of oxygen gas from exhaust gases. The oxygen-18 containing gas which is recycled preferably also contains oxygen-17 when it is returned to the optical fiber manufacturing process, in the relative concentrations described above (at least 5 percent, more preferably at least 10 percent, and most preferably at least 15 percent of the amount of oxygen-18 employed in the fiber).

Alternatively, the isotopically enriched oxygen may simply be reclaimed to a holding tank from which it can be shipped to an external facility for purification. The purification requirements of this embodiment are obviously less stringent than those in the one discussed above, but the separation techniques likely could be similar to those described above. A still alternative embodiment would be to pass the separated oxygen-18 to another stage in the process in which oxygen purity might not be as essential. This could be the case, for example, if an isotopic exchange was being performed in the consolidation process on a soot blank from an OVD or VAD laydown process.

Raman amplification may be achieved using the process known as stimulated Raman scattering (SRS). In this process, photons of a short wavelength pump are scattered by vibrational modes of the lattice of an optical material and add coherently to the long wavelength signal photons. When this occurs, an optical device commonly known as a Raman fiber amplifier is created. This gain spectrum of such a device is fixed relative to the pump wavelength by the frequency of the lattice vibrations in the optical fiber.

In a typical silica optical fiber, the maximum gain occurs at a frequency shift of 13.2 THz (440 $cm^{-1}$) from the pump frequency. If only a single pump wavelength is employed, the usable bandwidth of a Raman amplifier is limited to about 20 nm in the conventional 1560 nm telecommunications window. It is known to increase the bandwidth by using several pump wavelengths whose gain spectra overlap. However, such a technique requires multiple pump lasers, and the extra costs associated with each additional laser unit.

Figure 20:
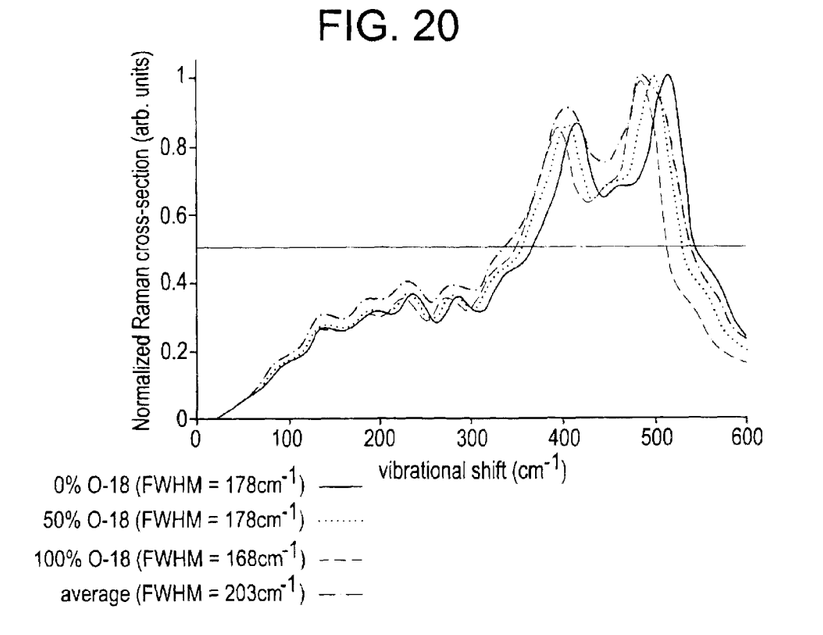
FIG. 20 compares the shifting and broadening of the theoretical Raman cross section for optical fibers containing various mixtures of oxygen-16 and oxygen-18.

The isotopically enriched fiber of the invention allows the bandwidth of a Raman fiber amplifier to be broadened with the use of only a single laser pump. Such broadening occurs as a result of the fact that replacement of the lighter isotopes of either oxygen or silicon for the less abundant heavier isotopes has the affect of shifting the Raman spectrum to the left, as is indicated by the dash lines in both FIG. 19. Note in particular that in silica formed from the natural abundance of oxygen-16, the main peak of the spectrum occurs at a frequency shift of 440 $cm^{-1}$ from the pump frequency. Replacing the oxygen-16 atoms with oxygen-18 shifts this peak to 420 $cm^{-1}$, a difference of 20 $cm^{-1}$. At 1560 nm, the wavelength range of interest for telecommunications, this corresponds to a wavelength shift of 5 nm. Since the most commonly used optical bandwidth around the 1560 nm range is 100 nm wide, a wavelength shift of 5 nm corresponds to approximately a 5 percent broadening of the Raman spectrum. In one embodiment, the isotopically enriched fiber is manufactured by process in which deposited layers alternate between layers of silica which are enriched with oxygen 18 (and preferably oxygen 17 as well) and layers of silica which are not enriched with oxygen 18 (i.e., primarily conventional oxygen is employed as the oxidant for these silica layers). It is believed that such alternating layers will facilitate the formation of some fibers, for example, those which are to be used for Raman applications. In particular, it is believed that the alternating layers will have a beneficial broadening effect on the Raman gain spectrum, as is illustrated in FIG. 20. In FIG. 20, four Raman cross section curves are illustrated for various fibers in accordance with invention, namely, which employ 0, 50, and 100 percent mixtures of oxygen-18 containing glass throughout their entirely, and a fourth, average curve, which can be obtained by forming the optical fiber preform using alternating layers of glass which employ 100% oxygen-18 substitution and layers of glass which employ naturally occurring oxygen. As is the case with all embodiments disclosed herein, preferably, the layers of glass which contain an increased amount of oxygen-18 also contain an increased amount of oxygen-17, in the relative concentrations described above (at least 5 percent, more preferably at least 10 percent, and most preferably at least 15 percent of the amount of oxygen-18 employed in the fiber).

The aforementioned discussion applies when the isotopic substitution occurs between oxygen-16 and oxygen-18. Some shifting will also occur if silicon 28 is replaced with silicon 30. However, as the amount of spectrum shift is substantially less (i.e. from 440 $cm^{-1}$ to 432 $cm^{-1}$ for only a 2 percent broadening) the use of oxygen-18 enrichment is the preferred embodiment of this particular aspect of the invention. In a preferred embodiment, this fiber is formed by depositing alternating regions in the core of 100 percent oxygen-18 enriched silica alongside regions of oxygen-16 silica.

The aforementioned findings indicate that the lattice motion of the silicon molecule is dominated by the oxygen atoms, rather than the silicon atoms. This domination indicates that the substitution of oxygen-18 for oxygen-16 in other glass materials with a structure similar to silica will also result in similar Raman spectrum broadening which may be advantageously exploited. In particular, oxygen-18 could be substituted for oxygen-16 in germania ($GeO_2$) doped silica where the germania is added to increase the Raman scattering coefficient and is further used is dispersion compensating fibers. This same principal could be applied to optical fibers used in Raman fiber lasers and cascaded Raman resonators which are often used as high-power pump sources for Raman amplifiers. Cascaded Raman resonators often employ phosphorous doped silica ($P_2O_{5-SiO_2}$) fibers to convert the output of ytterbium doped fiber laser at a wavelength of approximately 1 nm to a useful Raman pump wavelength in the 1400 nm wavelength region. The presence of the phosphorous doped silica creates a strong but relatively narrow Raman resonance at a frequency of about 40 THz and allows the wavelength conversion to be achieved in two successive frequency shifts. This invention encompasses the concept of replacing oxygen-16 and $P_2O_5$ with oxygen-18 in order to move this resonance by approximately 1.5 THz. This would allow a different range of approximately 1400 nm pump wavelengths to be generated from the same ytterbium fiber laser source.

While this invention has been described with respect to several preferred embodiments, various modifications and additions to the invention will become evident to persons of skill in the art. All such variations, modifications, and additions are intended to be encompassed within the scope of this application, which is limited only by the claims appended hereto.

What is claimed is:

1. An optical waveguide comprising multiple isotopes of oxygen in relative proportions sufficiently changed from a naturally occurring proportion of said isotopes such that optical properties of said waveguide are improved, wherein said waveguide includes a light conducting core region and at least 50 mole percent of said oxygen in said core is oxygen-18, and said core region also includes oxygen 17 in an amount which is at least 5 percent of the amount of oxygen 18 in said core.

2. The waveguide of claim 1, wherein said waveguide is an optical fiber waveguide comprised of $SiO_2$, and the silicon in said $SiO_2$ has not been enriched with a heavier isotope of silicon.

3. The waveguide of claim 2, wherein said oxygen 17 is present in an amount which is at least 10 percent of the amount of oxygen 18 in said core.

4. The optical waveguide of claim 3, wherein at least 70 mole percent of said oxygen in said core is oxygen-18 and the amount of oxygen 17 is greater than 5 mole percent of the total molar oxygen content.

5. The optical waveguide of claim 2, wherein said optical fiber further comprises a dopant element.

6. The optical waveguide of claim 5, wherein said dopant is one of the group consisting of germanium and phosphorous.

7. The waveguide of claim 2, the volume percent of the $SiO_2$, in said fiber which is enriched with oxygen 18 is less than 4 percent.

8. The optical waveguide of claim 2, wherein the fiber is a Raman gain fiber, and said isotopic proportions are changed to an extent that the Raman spectrum of said fiber is broadened, compared to an identical fiber having no additional oxygen- 18 therein, at least about 5 percent with respect to light having a wavelength of between about 900 $\mu$m and 1800 $\mu$m.

9. The optical waveguide of claim 2, wherein at least 70 mole percent of said oxygen in said core is oxygen-18, and the amount of oxygen 17 is greater than 5 mole percent of the total molar oxygen content.

10. The optical waveguide fiber of claim 1, wherein said fiber is comprised of layers of glass which alternate between layers having an increased amount of oxygen-18 and layers which do not.

* * * * *